United States Patent
Eren et al.

(10) Patent No.: US 8,629,400 B2
(45) Date of Patent: Jan. 14, 2014

(54) 3D SCANNER

(75) Inventors: Gonen Eren, Istanbul (TR); Aytul Ercil, Istanbul (TR); Luis A. Sanchez, Dijon (FR); Olivier Aubreton, Dijon (FR); David Fofi, Dijon (FR); Fabrice Meriaudeau, Dijon (FR); Frederic Truchetet, Dijon (FR)

(73) Assignee: Sabanci Universitesi, Istanbul (TR)

( * ) Notice: Subject to any disclaimer, the term of this patent is extended or adjusted under 35 U.S.C. 154(b) by 259 days.

(21) Appl. No.: 13/140,424

(22) PCT Filed: Dec. 16, 2008

(86) PCT No.: PCT/IB2008/055328
§ 371 (c)(1),
(2), (4) Date: Jun. 16, 2011

(87) PCT Pub. No.: WO2010/070383
PCT Pub. Date: Jun. 24, 2010

(65) Prior Publication Data
US 2011/0248168 A1    Oct. 13, 2011

(51) Int. Cl.
*G01J 5/02* (2006.01)
(52) U.S. Cl.
USPC ........................................ 250/341.1
(58) Field of Classification Search
USPC ............... 250/340, 341.1, 341.6, 341.8, 347
See application file for complete search history.

(56) References Cited

U.S. PATENT DOCUMENTS

| 6,128,086 A | 10/2000 | Fowler et al. |
| 6,367,968 B1 | 4/2002 | Ringermacher et al. |
| 6,587,600 B1 * | 7/2003 | Shipley .................. 382/284 |
| 2007/0271064 A1 | 11/2007 | Walton |

FOREIGN PATENT DOCUMENTS

| DE | 100 06 663 A1 | 8/2001 |
| EP | 0 007 227 A | 1/1980 |
| JP | 63 061107 A | 3/1988 |

OTHER PUBLICATIONS

International Search Report, mailing date Apr. 9, 2009, for corresponding International Application No. PCT/IB2008/055328.
International Preliminary Report on Patentability, mailing date Aug. 12, 2009, for corresponding International Application No. PCT/IB2008/055328.

* cited by examiner

*Primary Examiner* — Mark R Gaworecki
(74) *Attorney, Agent, or Firm* — Intellectual Property Law Group LLP

(57) ABSTRACT

The present invention relates to a 3D scanner (1) which is able to make 3D modeling of the transparent objects in real-time by utilizing the thermography technique in order to make quality control in the industry; comprising a slider (2), a heater (3), a thermal camera (5) and a control unit (6).

16 Claims, 1 Drawing Sheet

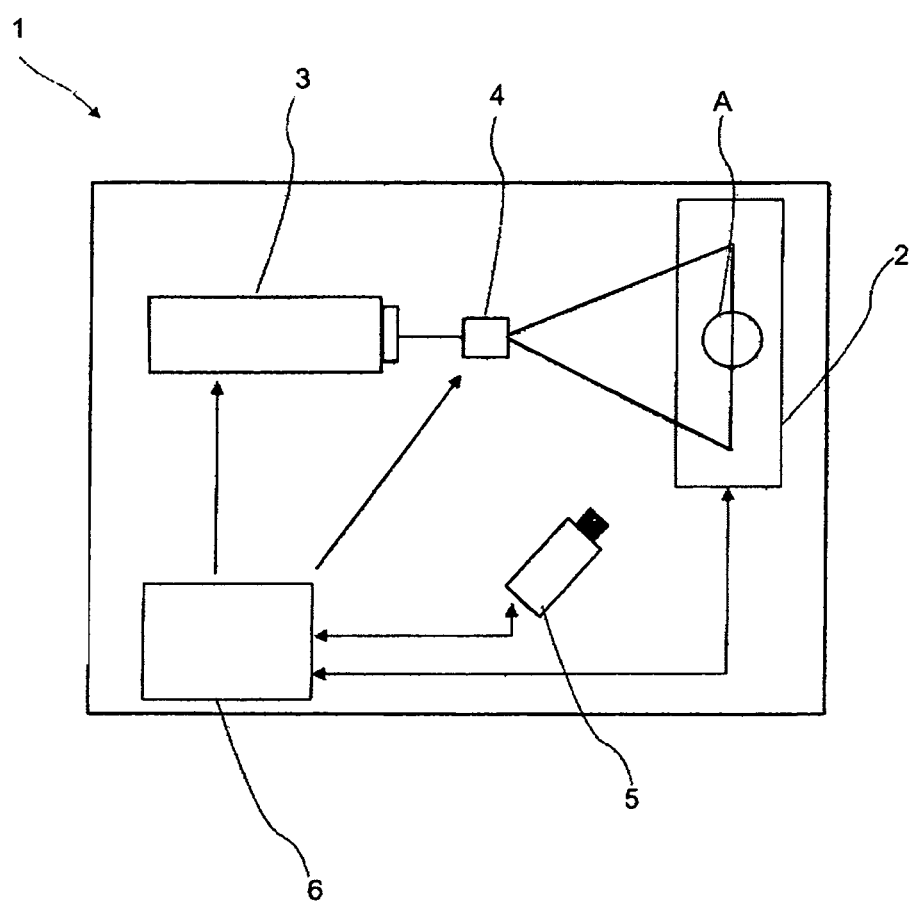

3D SCANNER

CROSS-REFERENCE TO RELATED APPLICATIONS

This application is a U.S. National Phase application, under 35 U.S.C. §371, of International Application no. PCT/IB2008/055328, with an international filing date of Dec. 16, 2008, which is hereby incorporated by reference for all purposes.

FIELD OF THE INVENTION

The present invention relates to a 3D scanner which builds up 3D models of transparent objects without having their problem of multi-reflection, by means of realizing analysis of temperature differences on surfaces of said objects.

BACKGROUND OF THE INVENTION

As the light not only reflects from transparent objects but also passes through them, making the 3D measurements of transparent materials like glass and acrylic leads to the problem of multi-reflection. For this reason, making the 3D measurements of transparent objects gets difficult. Therefore in measurement of the objects' surfaces with imaging systems, the opaque objects are being focused on in general, not the transparent objects. The surface measurements of the objects which reflect the light can be carried out by the methods of photometric stereo or coloured photometric stereo which can make shaping by means of shading. Whereas a new method reflects the light band to the transparent object and calculates the surface shape of the transparent object by using a generic algorithm. Polarization is another useful method in calculating the shape of the transparent objects. However the said methods can operate under special conditions and they are quite slow to be able to make real-time 3D modeling on production line and to be used in quality control.

In U.S. Pat. No. 6,367,968 within the state of the art, a system which is used to make measurement and controls on the surfaces of the objects by utilizing infrared thermography is mentioned. In said method, focal-plane array cameras are used as well. The apparatus which is mentioned in U.S. Pat. No. 6,367,968 determines changes taken place in the thickness of the object which has become thin. In said document by using a lamp, a particular region is heated in an equal distribution. Then the temperature distribution in the course of time is examined by the method of FFT (Fast Fourier Transform) and as the temperature distribution is different in regions which are thinner or thicker than normal, these regions are determined. As is seen, any 3D) modeling is not made in said document, only errors are measured from surface roughnesses by using thermography method.

Documents DE10006663A1, U.S. Pat. No. 6,128,086, JP63061107, US2007/0271064A 1 and EP0007227 describe applications which observe the reflected light off the surface of the objects and process them to obtain information about the surface shapes.

SUMMARY OF THE INVENTION

The objective of the present invention is to realize a 3D scanner which can make 3D modeling of the transparent objects in real-time to make quality control in the industry.

Another object of the present invention is to realize a 3D scanner which is able to make 3D modeling of the transparent objects without being effected by the internal reflections arising from the structure of the transparent objects, by utilizing the thermography technique.

Another object of the present invention is to realize a 3D scanner having not only the structures of the transparent objects but also the different materials' and being able to make the 3D modeling of the opaque objects as well.

DETAILED DESCRIPTION OF THE INVENTION

A 3D scanner realized to fulfill the objective of the present invention is illustrated in the accompanying FIGURE, in which:

FIG. 1 is schematic view of a 3D scanner.

The parts shown in the figures are individually numbered, where the numbers refer to the following:
1. 3D scanner
2. Slider
3. Heater
4. Optical object
5. Thermal camera
6. Control unit The 3D scanner (1) comprises at least one slider (2) on which the object (A) whose surface shape is desired to be determined is placed, and which has a moving structure; at least one heater (3) which provides to territorially heat the object (A) placed on the slider (2); at least one optical object (4) which disperses said beams in order to enable the beams coming from the heater (3) to reach the different points on the slider (2); at least, one thermal camera (5) which senses temperature differences on the surface of the object (A) heated territorially and at least one control unit (6) which carries out the 3D modeling of the object (A) with the values sensed by the thermal camera (5).

The slider (2) which is present on the inventive 3D scanner (1) and carries the object (A) whose surface shape is desired to be determined, is controlled by the control unit (6) with the purpose of heating all the regions by the heater (3) to get clear information. The object (A) which is present on the slider (2) while it is moving, is heated territorially by the heater (3). The heater (3) heats the surface of the object (A) preferably by using a $CO_2$ laser as a specific shape such as dot, dash or grid. According to height changes on the surface, deformations or transpositions may occur on these shapes. By determining these changes via the thermal camera (5), the 3D surface shape is calculated by the control unit (6).

In the inventive 3D scanner (1) the power of the heater (3) is determined by the control unit (6) in order to obtain the minimum temperature which can be detected by the thermal camera (5) according to the type and thickness of the material. The thermal camera (5) used in the inventive 3D scanner (1) preferably has a spectral range between 7.5-13 micrometer and a 320*240 pixel resolution. The light transmission coefficient of the glass is 1% in mentioned spectral range and the light reflection coefficient is in maximum value. In the present case, the glass can be thought as an opaque and reflective object.

In a preferred embodiment of the invention the object (A) is present on a fixed base and the system of camera (5) and heater (3) present on the scanner (1) is moving.

Within the framework of this basic concept, it is possible to develop a wide variety of embodiments of the inventive 3D scanner (1) and the invention can not be limited to the examples described herein, it is essentially according to the claims:

The invention claimed is:

1. A 3D scanner comprising at least one slider on which an object (A) whose surface shape is desired to be determined is placed, and which has a moving structure, at least one optical object, and at least one control unit;
   characterized by at least one heater which provides to territorially heat the object (A) placed on the at least one slider;
   the at least one optical object which disperses a plurality of beams in order to enable the beams coming from the at least one heater to reach different points on the at least one slider;
   at least one thermal camera which senses temperature differences on a surface of the object (A) heated territorially and the at least one control unit which carries out a 3D modeling of the object (A) with the values sensed by the thermal camera.

2. A 3D scanner according to claim 1, wherein the at least one thermal camera has a spectral range between 7.5-13 micrometers and a 320*240 pixel resolution.

3. A 3D scanner according to claim 2, wherein the at least one heater which territorially heats the surface of the object (A), is a $CO_2$ laser.

4. A 3D scanner according to claim 3, wherein the at least one control unit determines the power of the at least one heater, in order to obtain a minimum temperature which can be detected by the at least one thermal camera according to a type and thickness of a material of the object (A).

5. A 3D scanner according to claim 2, wherein the at least one control unit determines the power of the at least one heater, in order to obtain a minimum temperature which can be detected by the at least one thermal camera according to a type and thickness of a material of the object (A).

6. A 3D scanner according to claim 1, wherein the at least one heater which territorially heats the surface of the object (A), is a $CO_2$ laser.

7. A 3D scanner according to claim 6, wherein the at least one control unit determines the power of the at least one heater, in order to obtain a minimum temperature which can be detected by the at least one thermal camera according to a type and thickness of a material of the object (A).

8. A 3D scanner according to claim 1, wherein the at least one control unit determines the power of the at least one heater, in order to obtain a minimum temperature which can be detected by the at least one thermal camera according to a type and thickness of a material of the object (A).

9. A movable 3D scanner comprising an object (A) whose surface shape is desired to be determined, is placed on a fixed based, and comprising at least one optical object, and at least one control unit;
   characterized by at least one moving heater which provides to territorially heat the object (A), the at least one optical object which disperses a plurality of beams in order to enable the beams coming from the at least one moving heater to reach different points on a the object (A);
   at least one moving thermal camera which senses temperature differences on a surface of the object (A) heated territorially and the at least one control unit which carries out a 3D modeling of the object (A) with the values sensed by the at least one moving thermal camera.

10. A 3D scanner according to claim 9, wherein the at least one moving thermal camera has a spectral range between 7.5-13 micrometers and a 320*240 pixel resolution.

11. A 3D scanner according to claim 10, wherein the at least one moving heater which territorially heats the surface of the object (A), is a $CO_2$ laser.

12. A 3D scanner according to claim 11, wherein the at least one control unit determines the power of the at least one moving heater, in order to obtain a minimum temperature which can be detected by the at least one moving thermal camera according to a type and thickness of a material of the object (A).

13. A 3D scanner according to claim 10, wherein the at least one control unit determines the power of the at least one moving heater, in order to obtain a minimum temperature which can be detected by the at least one moving thermal camera according to a type and thickness of a material of the object (A).

14. A 3D scanner according to claim 9, wherein the at least one moving heater which territorially heats the surface of the object (A), is a $CO_2$ laser.

15. A 3D scanner according to claim 14, wherein the at least one control unit determines the power of the at least one moving heater, in order to obtain a minimum temperature which can be detected by the at least one moving thermal camera according to a type and thickness of a material of the object (A).

16. A 3D scanner according to claim 9, wherein the at least one control unit determines the power of the at least one moving heater, in order to obtain a minimum temperature which can be detected by the at least one moving thermal camera according to a type and thickness of a material of the object (A).

* * * * *